(12) United States Patent
Krishnamoorthy et al.

(10) Patent No.: US 6,498,798 B1
(45) Date of Patent: Dec. 24, 2002

(54) PRIORITY-BASED STATISTICAL MULTIPLEXER-HUB

(75) Inventors: Ashok V. Krishnamoorthy, Middletown, NJ (US); Martin C. Nuss, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/298,309

(22) Filed: Apr. 23, 1999

(51) Int. Cl.$^7$ .................................................. H04J 3/02
(52) U.S. Cl. ........................................ 370/537; 370/411
(58) Field of Search ................................. 370/537, 389, 370/407, 411, 252, 434, 442, 444, 445, 455, 532, 535, 538, 540, 541, 544, 391

(56) References Cited

U.S. PATENT DOCUMENTS

| | | | | |
|---|---|---|---|---|
| 5,166,926 A | * | 11/1992 | Cisneros et al. | 370/392 |
| 5,461,626 A | * | 10/1995 | Takase et al. | 370/388 |
| 5,541,914 A | | 7/1996 | Krishnamoorthy et al. | 370/427 |
| 5,768,270 A | * | 6/1998 | Ha-Duong | 370/389 |
| 5,875,190 A | * | 2/1999 | Law | 370/395 |
| 5,949,778 A | * | 9/1999 | Abu-Amara et al. | 370/388 |
| 6,026,092 A | * | 2/2000 | Abu-Amara et al. | 370/411 |

OTHER PUBLICATIONS

IEE Proc.–commun., vol. 145, No. 3, Jun. 1998—Design of knockout concentrators by Y.–S. Lin et al.*
K.S. Chan et al., "Clos–Knockout: A large–scale Modular Multicast ATM Switch", 1996 IEEE.*
Minze V. Chien et al., "Adaptive Binary Sorting Schemes and Associtated Interconnection Networks", IEEE transactions on parallel and distributed systems, vol. 5, No. 6, Jun. 1994.*
Hyunsoo Yoon et al., "The knockout switch under nonuniform traffic", 1988 IEEE.*
IEEE Journal of Solid–State Circuits, vol. 25, No. 6 Dec. 1990—A CMOS Batcher and Banyan Chip Set for B–ISDN Packet Switching by William S. Marcus.
IEEE Journal On Selected Areas in Communications, vol. SAC–5 No. 8 Oct. 1987—The Knockout Switch: A Simple, Modular Architecture for High–Performance Packet Switching by Yu–Shuan Yeh, fellow, IEEE, Michael G. Hluchyj et al.

* cited by examiner

Primary Examiner—Douglas Olms
Assistant Examiner—Phirin Sam
(74) Attorney, Agent, or Firm—Baker & McKenzie

(57) ABSTRACT

A statistically-multiplexed link for transporting aggregated data from multiple clients to a central server. A concentrator is used to separate packets containing valid data (live packets) from invalid (dead) packets. When combined with a conventional multiplexer, the concentrator circuit provides arbitration on a first-come first-served basis and allows a smaller multiplexer to service a larger number of inputs thereby enabling a more statistically efficient multiplexed link.

7 Claims, 2 Drawing Sheets

PRIORITY-BASED STATISTICAL MULTIPLEXER-HUB

FIELD IF THE INVENTION

The present invention relates to data communications systems.

BACKGROUND INFORMATION

Because of the changing nature of Local Area Network (LAN) traffic due to client-server and web-based applications, larger fractions of data are exiting individual workgroups for destinations outside the workgroups. With conventional approaches, a hub (or repeater) operating in accordance with a Carrier-Sense Multiple Access/Collision Detect (CSMA/CD) protocol is typically used to provide arbitration for the shared interconnection network.

Conventional Ethernet hubs or repeaters rely on CSMA/CD protocols being implemented on all incoming and outgoing ports, i.e., a conventional repeater or hub simply broadcasts the input arriving on a channel to all ports which are then able to apply the CSMA/CD protocol arbitration to determine when they are able to access the shared 10 Mbit/s (in the case of Ethernet) or 100 Mbit/s (in the case of Fast Ethernet) channel in half-duplex mode.

The connectivity paradigm in LANs is rapidly changing due to the surge in world-wide-web based traffic (in corporate Intranets and the Internet) and other client-server based computing applications. The old 80/20 rule-of-thumb for data traffic, where approximately 80% of data traffic stayed within the workgroup and only 20% of the traffic traveled the backbone, is quickly reversing to a 20/80 paradigm where most of the data traffic leaves the individual workgroups.

At higher data rates, a potential alternative to CSMA/CD-based links are dedicated point-to-point buffered full-duplex links. Such an approach may remove the need for conventional half-duplex repeaters. One type of device is a full-duplex buffered repeater such as the Gigabit Ethernet Buffered Repeater offered by Packet Engines. This device takes full-duplex ports as its inputs and performs CSMA/CD arbitration within the confines of a box that is only 1–2 meters wide, thereby allowing Gigabit speeds over lengths of hundreds of meters. Furthermore, this device allows several lower speed ports (e.g., 10–100 Mbit/s) to share a higher speed (e.g., 1 Gbit/s) output port.

Nonetheless, approaches that use the CSMA/CD protocol, such as the aforementioned full-duplex repeater, are subject to efficiency limitations. For instance, as the network load of a typical CSMA/CD link increases (e.g., to 50% or higher), the efficiency of the link is drastically impaired because most of the ports are sending colliding messages a large fraction of the time. As this happens, no single port can take control of the channel, and channel efficiency drops.

An alternative approach is the use of a multiplexer-hub, as shown in FIG. 1. A conventional multiplexer 110, as shown in FIG. 1, simply samples data consecutively from a plurality of lower-speed input lines and places them bit (or byte) interleaved onto a high-speed output line. A limitation of this approach, however, is that it may not always make the most efficient use of the bandwidth of the multiplexed link in real data networking situations, where the traffic is bursty (i.e., data packets arrive in bursts) and arrives at random intervals. The simple conventional multiplexer 110 does not provide any arbitration for access to its output link, so the output link must be provisioned with a capacity that is much greater than the input links. For instance, multiplexing data from N input lines onto one output line usually requires that the output line operate at N times the bit-rate of any of the input lines. Because it is not possible to determine a priori which input lines contain "live" data and which input lines are not carrying useful (or live) data—thanks to the random nature of packet arrivals at the inputs—it is quite possible that the live data is multiplexed onto the links along with data from the idle links that are not carrying live packets at that particular moment. Because arbitration is lacking, the high-bandwidth (and high-cost) link resource is hence not used optimally, thereby limiting the ability of many users to share the resource.

A simple multiplexed link, such as that of FIG. 1, while removing the inefficiency of the conventional CSMA/CD arbitration (at high loads) for aggregated traffic, may not necessarily represent a performance/cost improvement over the conventional CSMA/CD based hub discussed above.

SUMMARY OF THE INVENTION

The present invention provides a scaleable multiplex link which overcomes the limitations of conventional CSMA/CD and multiplexed systems. In an exemplary embodiment of a hub in accordance with the present invention, a statistical multiplexer, or concentrator, is used to efficiently combine multiple lower-speed data streams into a smaller number of higher-speed data streams. The higher-speed data streams are further combined in a multiplexer into one high-speed data stream.

The multiplexer-hub of the present invention is better suited to current trends in data traffic where most of the traffic within a sub-network exits due to an increase in client-server type traffic. A multiplexed link in accordance with the present invention is easier to implement while being more efficient than conventional arrangements.

DETAILED DESCRIPTION

Figure 1:
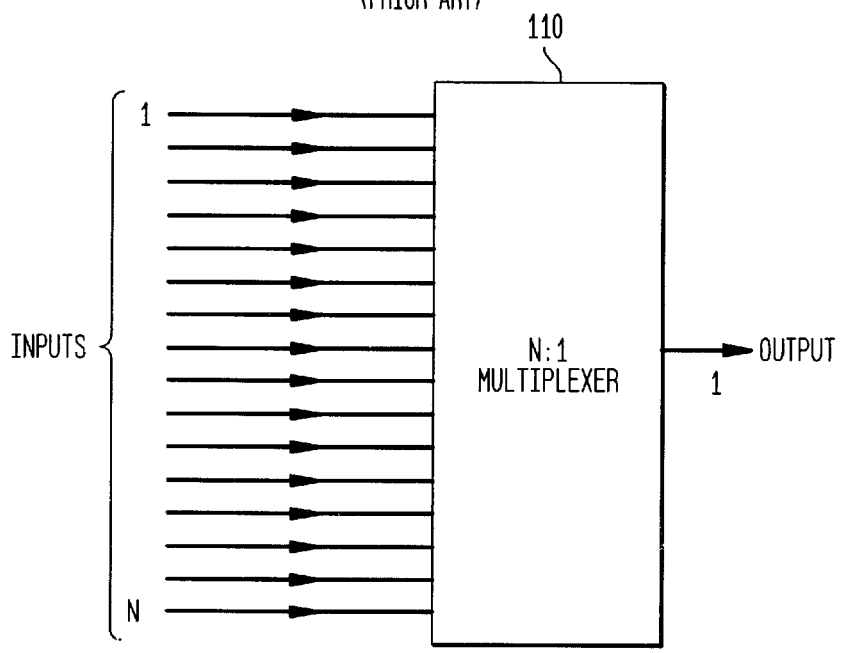
FIG. 1. shows a conventional N:1 multiplexer which bit-interleaves N input data streams into a single (N times) faster aggregated output data stream.
Figure 2:
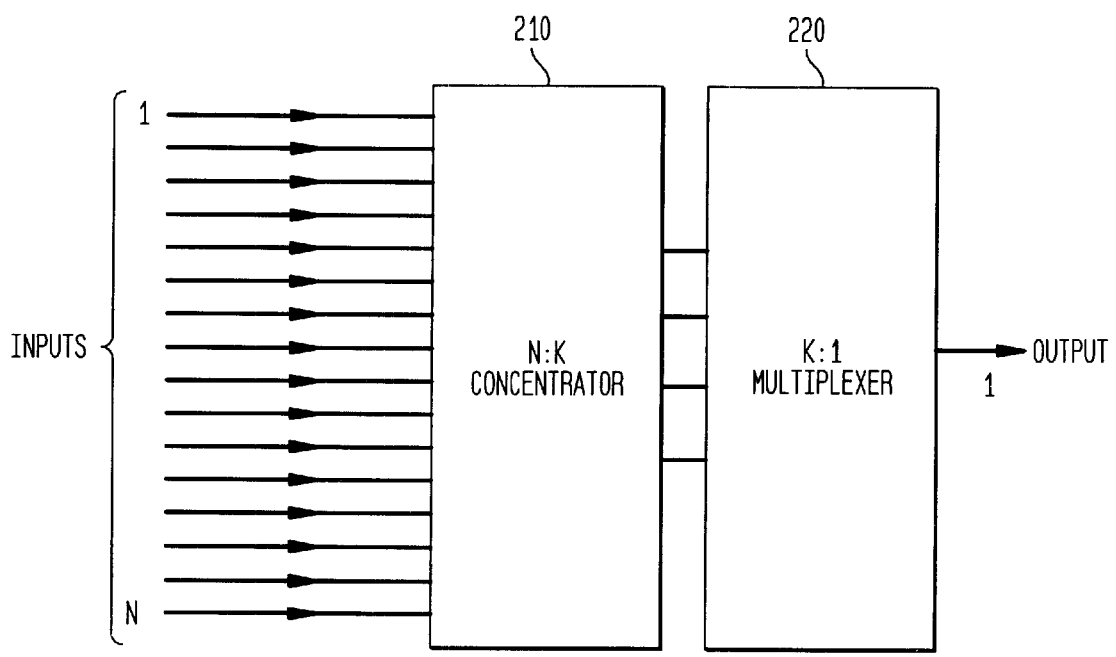
FIG. 2 shows a block diagram of an exemplary embodiment of a statistical multiplexer-hub in accordance with the present invention.

FIG. 2 shows a block diagram of an exemplary system in accordance with the present invention. The system of FIG. 2 comprises a N:K concentrator (or statistical multiplexer) 210 and a standard K:1 multiplexer 220. The N:K concentrator 210 has N input lines and K output lines, where N >K, typically. Each of the K output lines has the same data rate as each of the N input lines. The K outputs of the concentrator 210 are coupled to the K inputs of the K:1 multiplexer 220. The output of the K:1 multiplexer 220 has a data rate that is K times that at each of the K inputs of the multiplexer 220.

The concentrator 210 determines, at any given time, the subset of input lines that are carrying live data packets and forwards these live packets on the subset of input lines to the output lines. Because the subset of input lines that contain live packets is constantly changing due to changing traffic statistics, this concentrator behaves like a "statistical" multiplexer. This type of multiplexer provides some degree of arbitration to the higher speed output link. This makes it possible to build a LAN multiplexer that has N lower-speed inputs and an output link that has K times the capacity of an input link (where N>K).

By appropriately choosing the number of input lines and the number of concentrated output lines (i.e., N and K), it is possible to statistically maintain a very high efficiency of the high-speed link, and appropriately provision the multiplexed output link to provide a good combination of performance and cost, i.e., use the expensive high-speed LAN link more effectively. In other words, combining the statistical multiplexer 210 with the conventional multiplexer 220 allows a smaller multiplexer to service a larger number of inputs, thereby enabling a more statistically efficient link.

The numbers K and N should be selected in accordance with the proportion of packets carrying live data, or the utilization rate. Thus, for example, if it is found by statistically sampling 16 input lines that on average only four input lines carry live data packets at any one time, then an appropriate value for K, for that application, would be four.

In an exemplary embodiment, the concentrator 210 can be implemented using a knockout concentrator, such as is described in Y. S. Yeh et al., "The knockout switch: A simple, modular, architecture for high-performance packet switching," IEEE Journal of Selected Areas in Communication, Vol. SAC-5, No. 8, pp. 1274–1283, October 1987. An improved design for a concentrator (that uses fewer circuit elements) is described in U.S. Pat. No. 5,541,914 to Krishnamoorthy et al., entitled, PACKET-SWITCHED SELF-ROUTING MULTISTAGE INTER-CONNECTION NETWORK HAVING CONTENTION-FREE FANOUT, LOW-LOSS ROUTING, AND FANIN BUFFERING, and incorporated herein by reference in its entirety. Such concentrator designs are well-suited for multiplexed LANs because they are intrinsically memory-less circuits and hence can be designed in VLSI circuit technologies to operate at high bit-rates.

The statistical multiplexer-hub of the present invention as disclosed above, can be used in aggregating data traffic from multiple low-speed ports to one or a few high-speed ports. For data traffic in the opposite direction, data from the high-speed ports would be demultiplexed to the multiple low-speed ports. A bidirectional hub for handling both upstream and downstream data traffic would perform both multiplexing and demultiplexing functions. A block diagram of an exemplary embodiment of a bidirectional system in accordance with the present invention is shown in FIG. 3.

Figure 3:
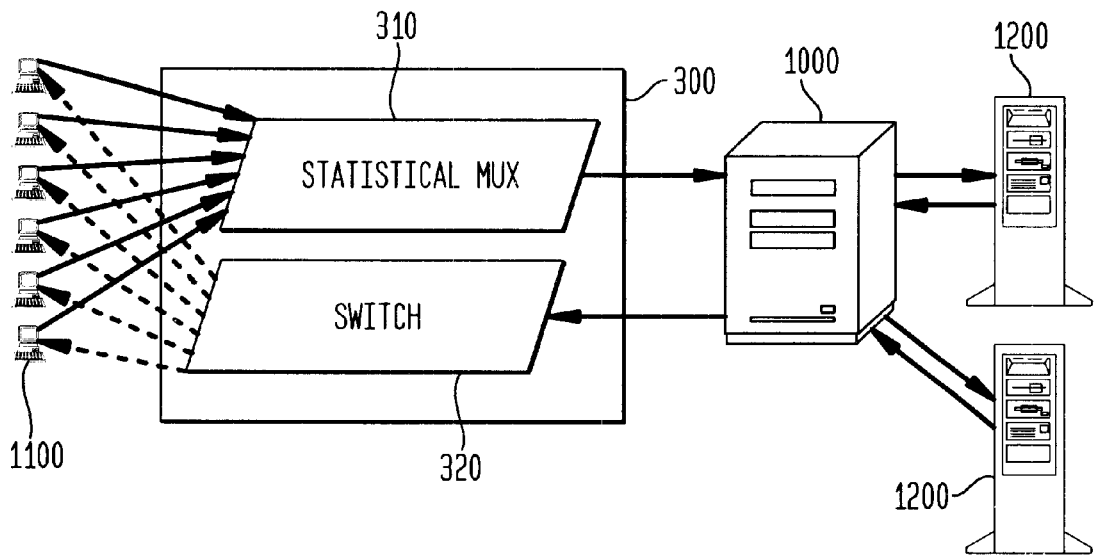
FIG. 3 shows a block diagram of an exemplary embodiment of a bidirectional hub in accordance with the present invention.

As shown in FIG. 3, an exemplary bidirectional hub 300 comprises a statistical multiplexer 310 and a switch 320. The statistical multiplexer 310 multiplexes low-speed upstream data from multiple users 1100 into a high-speed data stream which is output to an external device such as a layer 3 switch or router 1000. The switch/router 1000 is coupled to one or more servers 1200. The switch 320 decodes the addresses (e.g., MAC addresses) in downstream packets received from the switch/router 1000 and switches the packets in accordance with the decoded addresses to the correct destination user 1100. The switch 320 could be, for example, a layer 2 switch. The server 1200 and/or the router 1000 is responsible for the assignment of the correct MAC (layer 2) addresses for the downstream traffic that is returned in response to upstream queries from the multiple users 1100.

Due to the changing nature of data traffic, individual full-duplex point-to-point links for both upstream (from user to server) and downstream (from server to user) traffic are typically not needed, and it may be entirely feasible to logically separate upstream from downstream traffic. Connectivity between upstream and downstream traffic would be handled entirely by the server and the LAN switches/router in the backbone.

Figure 4:
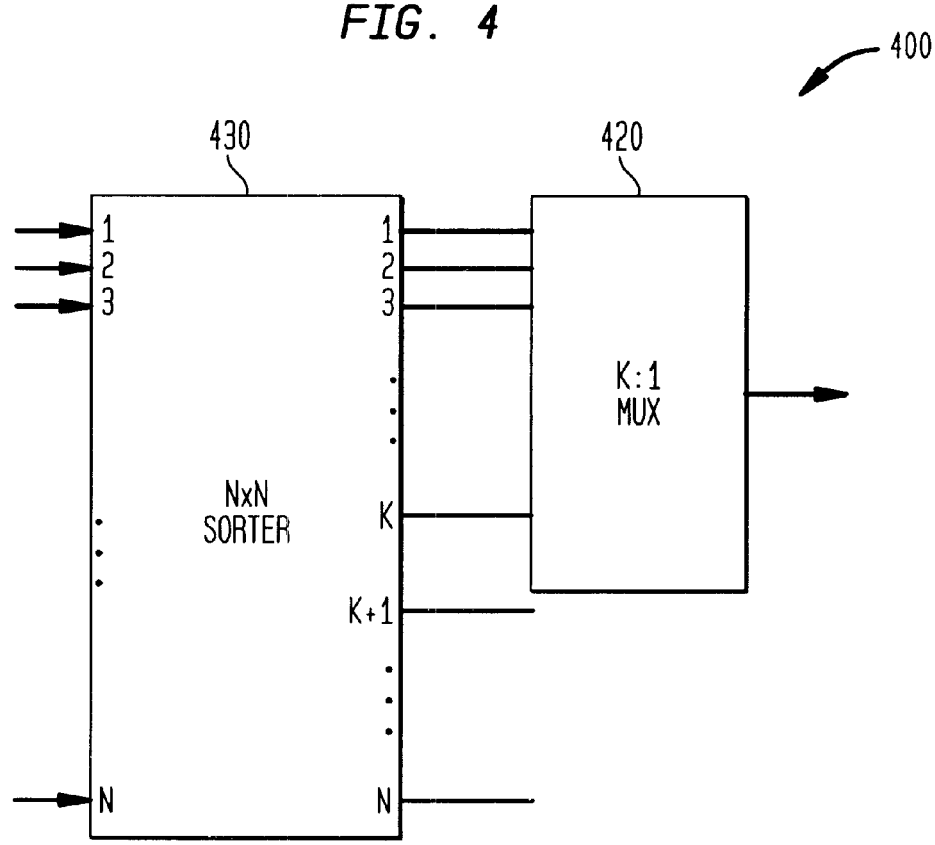
FIG. 4 shows a block diagram of an exemplary embodiment of a multiple-priority multiplexer-hub, in accordance with the present invention.

FIG. 4 shows a block diagram of an exemplary embodiment of a multiple-priority multiplexer-hub 400 in accordance with the present invention. In addition to differentiating live packets from dead packets, the multiplexer-hub 400 of FIG. 4 is further able to separate packets having different levels of priority. In Ethernet, for example, each packet header can specify a priority level for the attached packet, including whether the packet is a live or dead packet. The multiplexer-hub 400 reads this priority information in the packet headers and differentiates packets according to their priority level, preferentially sending packets to the inputs of the multiplexer. This provides the additional benefit of differentiated statistical allocation of bandwidth according to packet priority as specified in the information contained in the packet headers.

The exemplary multiplexer-hub 400 of FIG. 4 comprises a NxN sorter 430 and a K:1 multiplexer 420. The sorter 430 can be implemented as a Batcher sorter (see, e.g., "A CMOS Batcher and Banyan Chip Set for B-ISDN Packet Switching," IEEE Journal of Solid-State Circuits, Vol. 25, No. 6, December 1990, pp. 1426–1432.) The NxN sorter 430 sorts incoming packets at its inputs 1-N according to the packets' priority level as indicated in the packets' headers. The packets are routed by the sorter 430 to an output of the sorter in accordance with the packets' priority level. In the exemplary embodiment of FIG. 4, the highest priority packet is routed to output 1, with successively lower priority packets being routed to successively higher-numbered outputs.

The outputs 1 through K of the sorter 430 are coupled to the K inputs of the K:1 mulitplexer 420 whereas the outputs K+1 through N of the sorter 430 are ignored. As such, the K highest priority packets coming into the hub 400 at any one time are routed to the high-speed output of the hub whereas the N–K lowest priority packets are dropped. In accordance with commonly used protocols, the dropped packets will be retransmitted by their sources when the sources determine that the packets were not received by their intended recipients.

The hub 400 of FIG. 4 thus performs N:K concentration while prioritizing the packets routed therethrough. In an alternative embodiment, the NxN sorter can be replaced with an N:K concentrator having a multi-level priority sorting capability such as described in co-pending U.S. patent application Ser. No. 09/288,725, entitled A SCALABLE N TO L CONCENTRATOR WITH MULTI-LEVEL PRIORITY, filed on Apr. 9, 1999 and incorporated herein by reference in its entirety.

What is claimed is:

1. A data communications hub comprising:
 a concentrator, the concentrator having a first number of inputs carrying data at a first data rate and a second number of outputs carrying data at the first data rate, at least the second number of outputs being selected by sampling the first number of inputs to determine an average number of inputs carrying live data packets at any given time, wherein the first number is larger than the second number; and a multiplexer, the multiplexer having an output and having inputs coupled to the second number of outputs of the concentrator, wherein the output carries data at a second data rate which is greater than the first data rate, wherein the concentrator determines which of the first number of inputs have the live data packets and provides the live data packets to one or more of the second number of outputs, and wherein the multiplexer receives the live data packets from the concentrator and interleaves the live data packets onto the output of the multiplexer.

2. A data communications hub in accordance with claim 1, comprising a switch for selectively switching data from a transmitting source to a plurality of receiving terminals.

3. A data communications hub in accordance with claim 1, wherein the concentrator determines a priority level of the live data packets and provides the live data packets to the one or more of the second number of outputs in accordance with the priority level.

4. A data communications hub comprising:

a sorter, the sorter having a first number of inputs and outputs and operable for determining which of the first number of inputs have live data packets and for outputting the live data packets to respective outputs in accordance with a priority level of the live data packets; and a multiplexer, the multiplexer having an output and a second number of inputs coupled to selected outputs of the sorter, wherein the multiplexer receives the live data packets from the sorter and interleaves the live data packets onto the output of the multiplexer and wherein the first number is greater than the second number.

5. The data communications hub of claim 4, wherein each packet of data has a header and each header indicates the priority level of the data in the packet and whether the data is live data or dead data.

6. The data communications hub of claim 4, wherein the priority level includes at least one of an active and an inactive level.

7. The data communications hub of claim 4, wherein data of a lowest priority level is ignored.

* * * * *